(12) United States Patent
Volponi et al.

(10) Patent No.: US 7,853,441 B2
(45) Date of Patent: Dec. 14, 2010

(54) SYSTEMS AND METHODS INVOLVING ENGINE MODELS

(75) Inventors: Allan J. Volponi, West Simsbury, CT (US); Ravi Rajamani, West Hartford, CT (US); Frederick A. Just-Agosto, Mayaguez, PR (US); David Serrano, Mayaguez, PR (US)

(73) Assignee: United Technologies Corp., Hartford, CT (US)

( * ) Notice: Subject to any disclaimer, the term of this patent is extended or adjusted under 35 U.S.C. 154(b) by 509 days.

(21) Appl. No.: 11/843,193

(22) Filed: Aug. 22, 2007

(65) Prior Publication Data

US 2009/0055145 A1 Feb. 26, 2009

(51) Int. Cl.
*G06G 7/48* (2006.01)
(52) U.S. Cl. .............................................. 703/7; 703/8
(58) Field of Classification Search ...................... 703/7, 703/8
See application file for complete search history.

(56) References Cited

U.S. PATENT DOCUMENTS

| | | | |
|---|---|---|---|
| RE34,316 E * | 7/1993 | Katogi et al. | 123/406.32 |
| 5,594,180 A | 1/1997 | Carpenter et al. | |
| 6,181,975 B1 | 1/2001 | Gross et al. | |
| 6,246,972 B1 | 6/2001 | Klimasauskas | |
| 6,456,928 B1 | 9/2002 | Johnson | |
| 6,539,337 B1 | 3/2003 | Provan et al. | |
| 6,662,089 B2 | 12/2003 | Felke et al. | |
| 6,909,960 B2 | 6/2005 | Volpini et al. | |
| 7,136,809 B2 | 11/2006 | Volponi | |
| 7,216,071 B2 | 5/2007 | Volponi | |
| 7,233,884 B2 | 6/2007 | Volponi | |
| 2004/0030417 A1* | 2/2004 | Gribble et al. | 700/29 |

\* cited by examiner

*Primary Examiner*—Hugh Jones
*Assistant Examiner*—Saif A Alhija

(57) ABSTRACT

Systems and methods involving engine models are provided. A representative method for updating a gas turbine engine reference model includes: determining whether an absolute difference between a dominant time constant of a sensor and an assumed sensor model time constant is outside a tolerance value; and responsive to determining that the absolute difference is outside the tolerance value, updating the assumed sensor model time constant with the dominant time constant of the sensor.

9 Claims, 4 Drawing Sheets

SYSTEMS AND METHODS INVOLVING ENGINE MODELS

BACKGROUND

1. Technical Field

The invention relates to engine sensor models.

2. Description of the Related Art

Gas turbine engines use engine models to monitor and control their operation. On-board real-time engine models are used for a number of purposes including engine control, performance tracking, fault anomaly detection, and virtual sensor analytic redundancy.

SUMMARY

Systems and methods involving engine models are provided. In this regard, an exemplary method for updating a gas turbine engine reference model comprising the steps of: determining whether an absolute difference between a dominant time constant of a sensor and an assumed sensor model time constant is outside a tolerance value; and responsive to determining that the absolute difference is outside the tolerance value, updating the assumed sensor model time constant with the dominant time constant of the sensor.

An exemplary embodiment of a gas turbine engine reference model system comprises: a sensor operative to measure a first engine parameter and a second engine parameter of a gas turbine engine; a sensor model having a sensor model time constant; and a processor operative to determine if a gas turbine engine is in a transient operating condition, wherein responsive to determining that the engine is in a transient operating condition, the processor is further operative to: determine whether an absolute difference between a dominant time constant of the sensor and the sensor model time constant is outside a tolerance value; and responsive to determining that the absolute difference is outside the tolerance value, update the sensor model time constant with a value corresponding to the dominant time constant of the sensor.

An exemplary embodiment of a computer-readable medium having computer-executable instructions stored thereon for performing a method for updating a gas turbine engine reference model comprises the steps of: determining whether an absolute difference between a dominant time constant of a sensor and an assumed sensor model time constant is outside a tolerance value; and responsive to determining that the absolute difference is outside the tolerance value, updating the assumed sensor model time constant with the dominant time constant of the sensor.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods involving the modeling of engines are provided. In this regard, several exemplary embodiments are described. Notably, engine models are used for monitoring and controlling gas turbine engines. For example, control loop systems involve monitoring of engine temperatures to modify and limit the fuel demand to limit over-temperature conditions for safe operation of the engines. These control systems are particularly useful when an engine is undergoing dynamic maneuvers such as engine acceleration or deceleration. Current data regarding the dynamic characteristics of the sensors providing this information is useful in maintaining appropriate control. Particularly, it is desirable for engine models to detect and accommodate faulty sensor data.

Engine models also provide the reference level for performing gas turbine engine performance tracking and anomaly detection to monitor engine and engine sensor deterioration. This tracking supports maintenance operations and logistics as well as alerting operators of potential imminent failure of engines. This information reduces exposure to in-operation shutdowns and unscheduled engine removals.

Thus, the embodiments described below allow for the transient response of engine sensors to be calculated in the time domain. These calculations provide for the detection of sensor anomalies that may not be detectable when an engine is in a steady state mode. This enables the adjustment and/or correction of engine models to compensate for degradation in one or more sensors.

Figure 1:
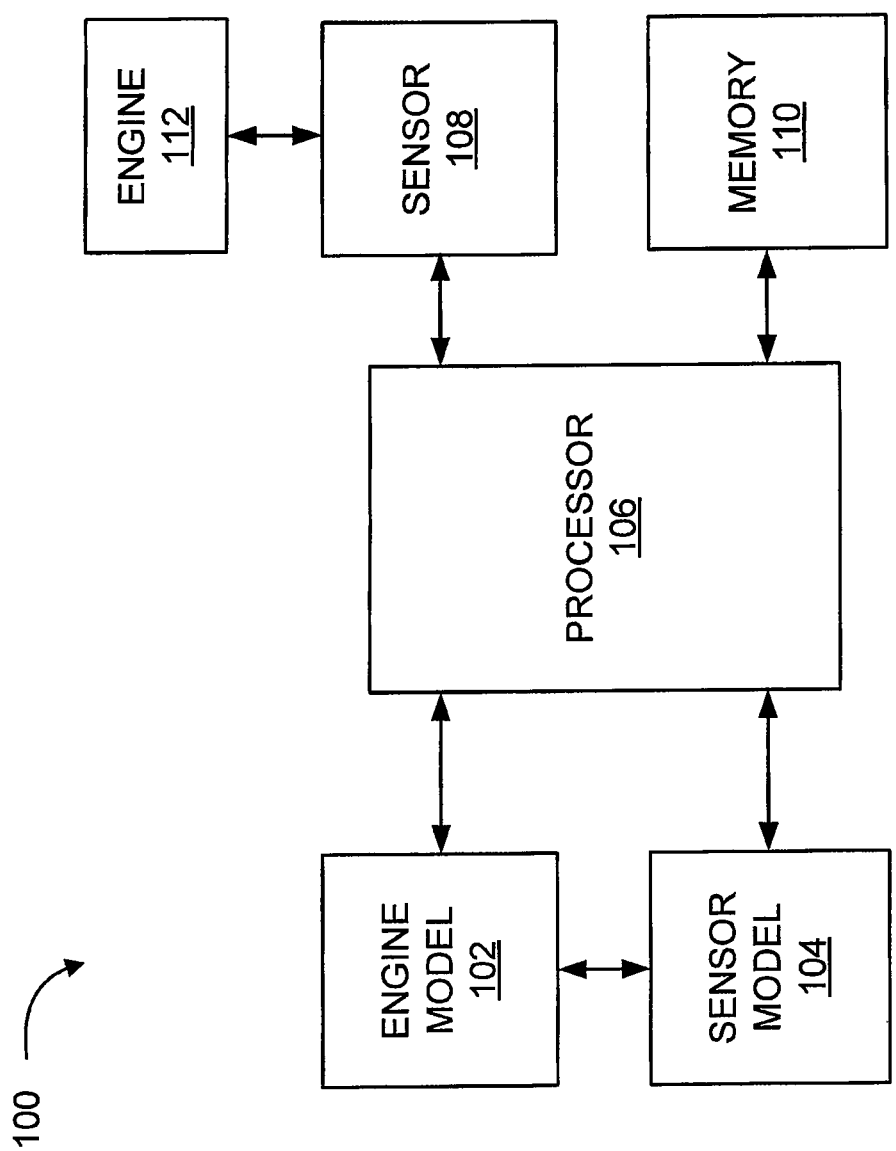
FIG. 1 illustrates an exemplary embodiment of an engine model system.

FIG. 1 illustrates an exemplary embodiment of an engine model system 100. As shown in FIG. 1, system 100 includes an engine 112 and a sensor 108 that is communicatively coupled with a processor 106. Sensor 108 is a temperature sensor (e.g., a thermocouple) in this embodiment, but other types of sensors (e.g., flow meters and speed sensors) also could be used.

The processor 106 is communicatively coupled to a memory 110, a sensor model 104, and an engine model 102. The sensor model 104 is associated with the sensor 108 and, in this embodiment, is communicatively coupled with the engine model 102. Alternatively, functionality associated with a sensor model may be an integrated with an engine model in other embodiments.

In operation, the sensor 108 monitors an engine parameter, such as temperature data, and provides data corresponding to the engine parameter to the processor 106, which may store the data in memory 110. The processor 106 processes the data stored in the memory 110 and calculates a time constant of the sensor 108. The processor 106 compares the time constant of the sensor 108 to the time constant of the sensor model 104. If the difference between the time constant of the sensor 108 and the time constant of the sensor model 104 is outside of a threshold value, the processor 106 updates the sensor model 104 with the time constant of the sensor 108. By updating the time constant of the sensor model, degradation of the sensor, which may occur over time, can be accommodated.

It should be noted that an engine model system can be integrated into various components such as, for example, into a Full Authority Digital Engine Control (FADEC). In an exemplary embodiment, the FADEC may be physically attached to the gas turbine engine.

Figure 2:
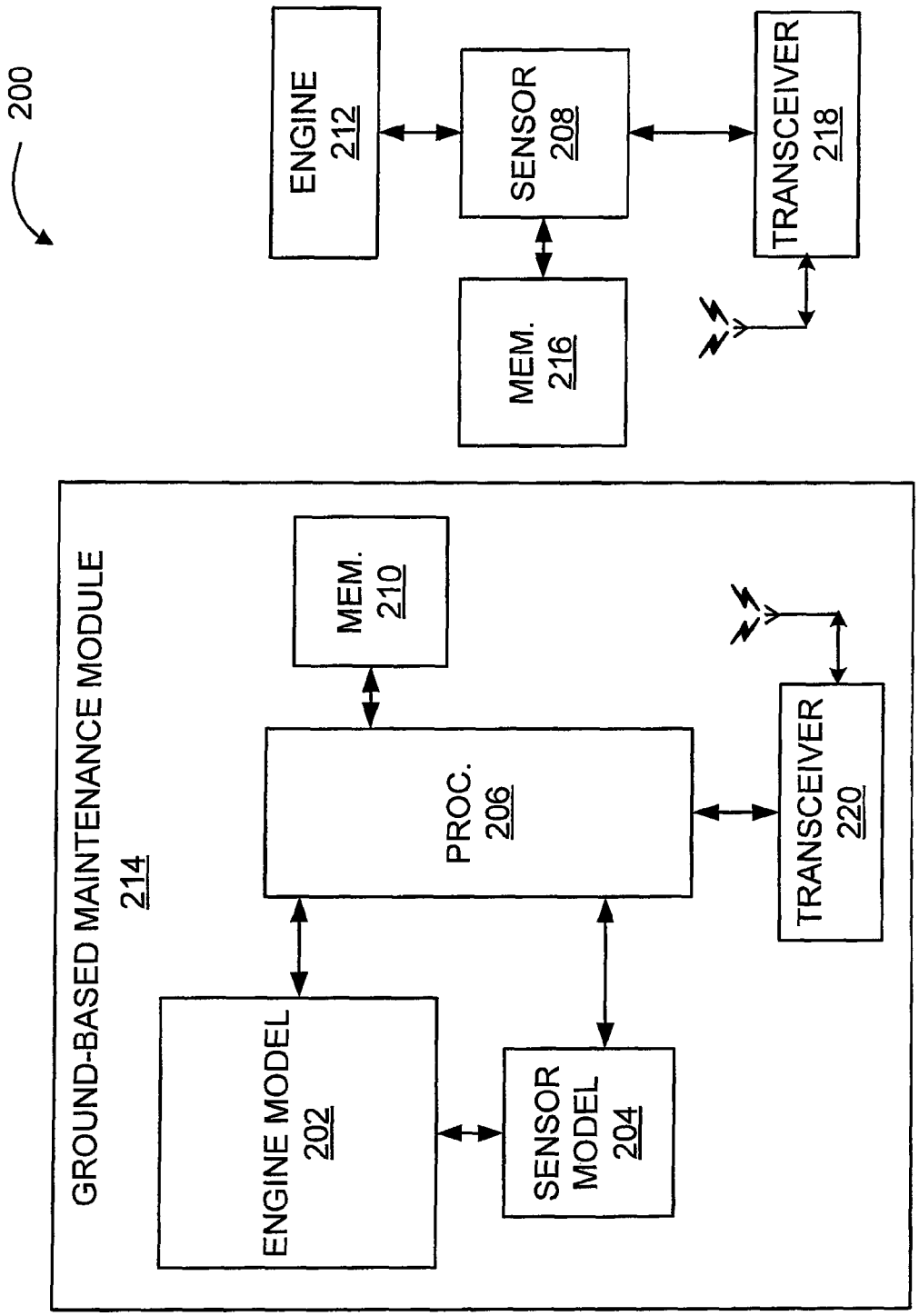
FIG. 2 illustrates another embodiment of an engine model system.

FIG. 2 illustrates an alternative exemplary embodiment of a system that includes a gas turbine engine 212 and a ground-based maintenance module 214. Ground-based maintenance module 214 includes a processor 206 that is communicatively coupled to a memory 210, a transceiver 220, a sensor model 204, and an engine model 202. The sensor model 204 is associated with a sensor (e.g., sensor 208), that is communicatively coupled with the engine model 202.

System 200 also includes a sensor 208 that monitors an engine parameter of engine 212. In the embodiment of FIG. 2, memory 216 is communicatively coupled to the sensor.

In operation, sensor 208 monitors an engine parameter, such as temperature, and provides data corresponding to the parameter to the processor 206 via the transceiver 218 and the transceiver 220 using, for example, radio frequency transmission. The processor 206 processes the data, which can be stored in the memory 210, and calculates a time constant of the sensor. The processor 206 uses logic to compare the time constant of the sensor to the time constant of the sensor model 204. The processor 206 then determines whether or not the sensor model 204 requires updating. For instance, if the difference between the time constant of the sensor 208 and the time constant of the sensor model 204 is outside of a threshold value, the processor 206 updates the time constant of the sensor model 204, such as with the calculated time constant.

In another alternative embodiment, the sensor 208 can be communicatively coupled to the ground-based maintenance module 214 via a temporary physical connection. Alternatively, the memory 216 may be removable, thus allowing the memory 216 to be removed from an aircraft and data stored therein to be used by the ground-based maintenance module 214.

Monitoring engine parameter data provides the basis for performing gas turbine engine performance tracking. The dynamic behavior of measurement devices, particularly detecting and quantifying the changes in the dynamic responses of measurement devices, is useful in performing gas turbine engine performance tracking. By monitoring sensors based on the transient behavior, degradation of engine sensors may be detected that may not be perceived when the engine is operating at steady state. This, in turn, can allow a sensor model to be updated in order to compensate for sensor degradation.

Figure 3:
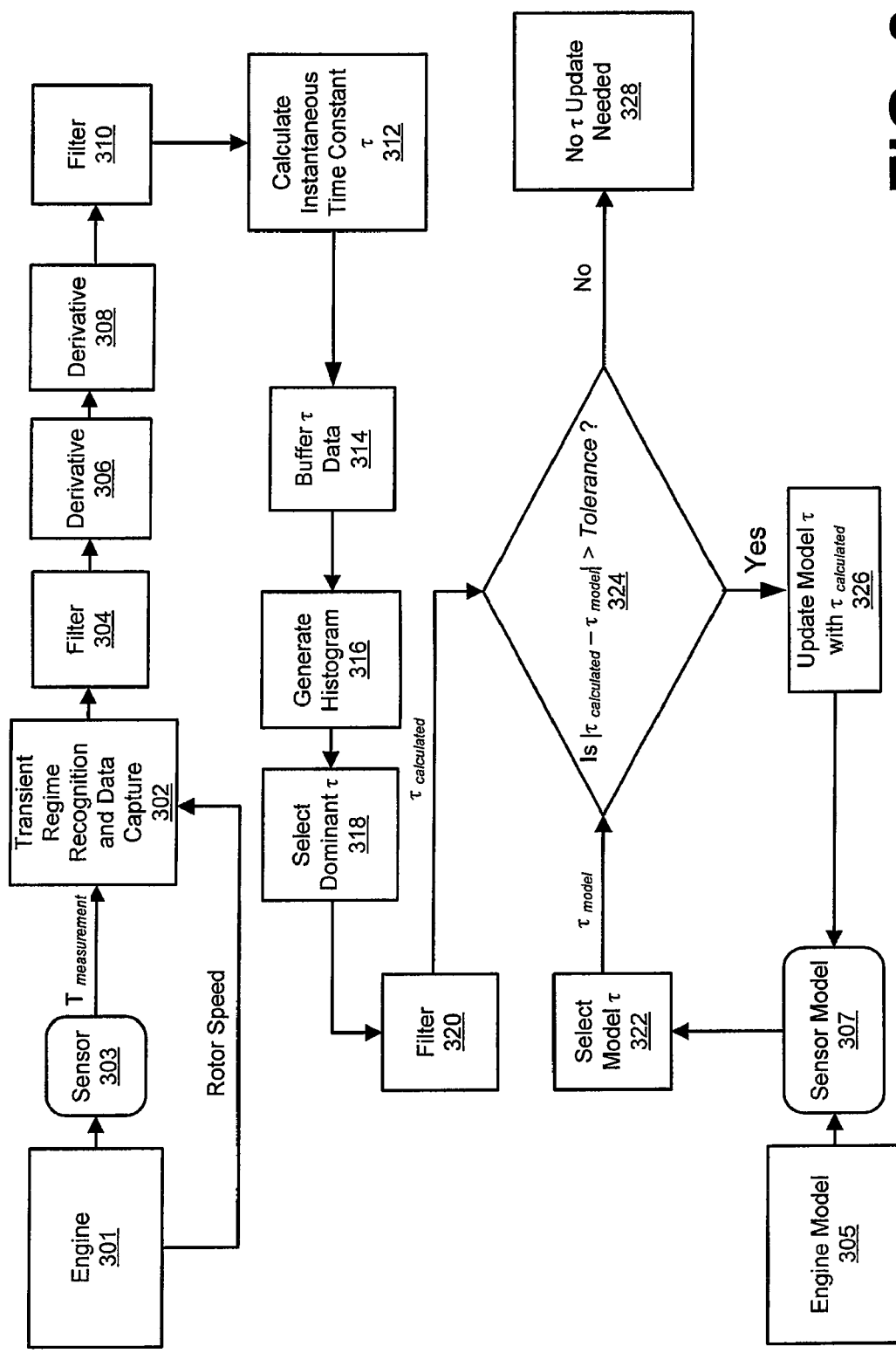
FIG. 3 is a flow diagram of an embodiment of a method for modeling engines.

FIG. 3 is a schematic diagram depicting functionality of an embodiment of a system for performing dynamic gas turbine engine performance tracking. It should be noted that this exemplary embodiment uses a temperature sensor. However, such methods are not limited to use with temperature sensors as a variety of sensors can be used in other embodiments.

In the embodiment of FIG. 3, a temperature sensor is represented by a transfer function model. The transfer function model is used to detect and quantify the changes in the dynamic response of the temperature sensor. The thermal time constant ($\tau$) of the transfer function model may be represented by the following equation:

$$\tau = \frac{\Delta t}{\ln\left(\frac{T''(t)}{T''(t + \Delta t)}\right)}$$

The above equation yields the basis for a time constant algorithm for any first order system that enables discrete thermal time constant calculations of the sensor. To estimate the time constant ($\tau$) the engine must be in a transient state (non-steady state) condition such as acceleration or deceleration.

Referring to FIG. 3, engine 301 includes temperature sensor 303 that sends a temperature measurement ($T_{measurement}$) to a processor. Engine 301 may also include a rotor speed sensor (not shown) that sends rotor speed data to the processor. The processor uses logic in block 302 to determine whether the rotor speed data indicates that the engine 301 is in a transient state. If the engine 301 is in a transient state, the processor also begins data capture in block 302.

The temperature data collected in block 302 may be filtered in block 304 to mitigate the effects of sensor noise and non-repeatability. The filtering may be accomplished using a variety of methods, e.g., averaging.

A time-derivative is applied to the filtered temperature data in blocks 306 and 308. These derivatives may take a variety of forms. The following derivative is a non-limiting example of a fourth order backward finite difference derivative used in this embodiment where $\Delta t$ refers to the sampling time interval for the data:

$$T'(t) = \frac{3T(t) - 4T(t - \Delta t) + T(t - 2\Delta t)}{2\Delta t}$$

Once the two time-derivative blocks 306 and 308 are completed, the second derivative ($T''(t)$) may be filtered in block 310 to remove outliers and further reduce the effects of noise.

After block 310, the instantaneous thermal time constant ($\tau$) is calculated in block 312 using the equation:

$$\tau = \frac{\Delta t}{\ln\left(\frac{T''(t)}{T''(t + \Delta t)}\right)}$$

An N amount of (T) data is buffered in a memory in block 314. The number of points in the buffer is established as a design parameter for a particular engine system. A histogram may be utilized to remove irregularities that may be present in the instantaneous thermal time constant ($\tau$) calculation and to isolate the most dominant value for the instantaneous thermal time constant ($\tau$).

A histogram is a count of the number of ($\tau$) points that fit into n sub-intervals (or bins) that subdivide the interval between min($\tau_i$) and max($\tau_i$) for i=1, 2, ..., N. The number of bins (n) to be used can be determined by a variety of means. In this exemplary embodiment, Sturgis' formula is used. Sturgis' formula is represented as:

$n$=greatest_integer[1+3.3 log$_{10}$($N$)]

The bins are formed by subdividing the range of ($\tau$) data into n sub-intervals as given in the equation:

Range=max($\tau_i$)−min($\tau_i$)

$W$=Range/$n$

Bin$_1$=min($\tau_i$)+$W$

Bin$_2$=min($\tau_i$)+2$W$

M=M $$Bin_i = \min(\tau_i) + iW$$

$$M = M$$

$$Bin_n = \min(\tau_i) + nW$$

Figure 4:
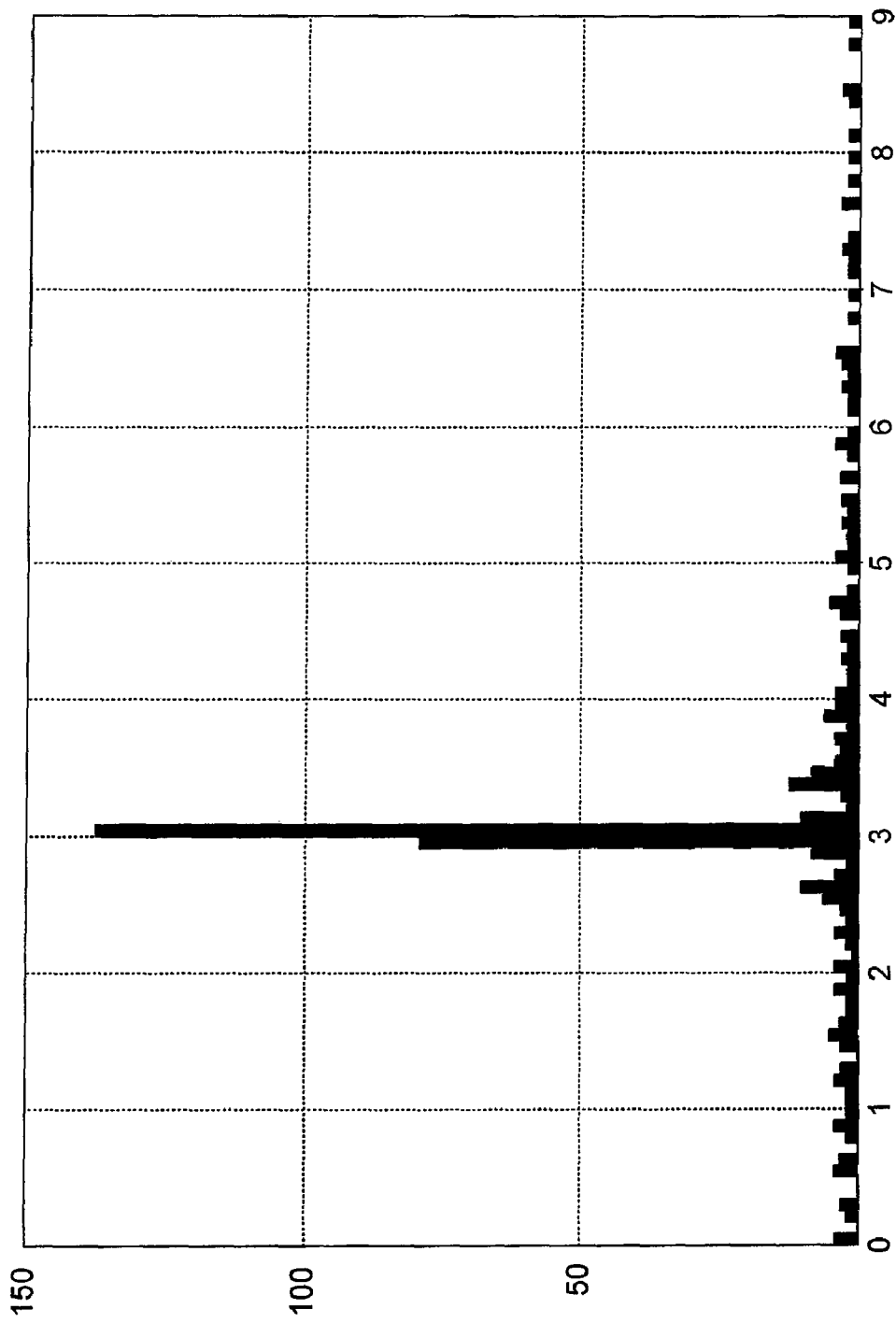
FIG. 4 illustrates an exemplary embodiment of a histogram.

The histogram is generated in block 316 by counting the frequency (number) of (T) points that reside in each bin. For example, ($\tau_k$) will reside in the $i^{th}$ bin if and only if $Bin_{j-1} < \tau_k \leq Bin_j$. An illustrative example of a possible histogram that may be generated is shown in FIG. 4. In this example, the dominant time constant calculated is at $\tau=3$ seconds.

After the histogram is generated, a dominant time constant is determined in block 318 by selecting the bin with the maximum number of points (largest frequency) and selecting the midpoint of the bin interval as the selected ($\tau$). These calculations are repeated as new data becomes available. A filter may be applied in block 320 to remove any noise from the estimate. The estimate is referred to as ($\tau_{calculated}$).

As actual engine data is being processed to estimate $\tau_{calculated}$, the engine model 305 with its attendant temperature sensor model 307 generates model estimates of the same monitored engine parameters. An assumed time constant ($\tau_{model}$) is available, and is extracted from the sensor model 307 in block 322.

In block 324, a comparison between the estimated time constant $\tau_{calculated}$ and the assumed model time constant $\tau_{model}$ is made and compared to a pre-specified limit (Tolerance) to note any exceedence of the Tolerance. An absolute difference of $\tau_{calculated} - \tau_{model}$ outside the Tolerance may indicate a form of sensor deterioration. If such an exceedence is detected in block 324, the model time constant $\tau_{model}$ may be updated with $\tau_{calculated}$ in block 326, and the updated model time constant $\tau_{model}$ may be sent to the sensor model 307. If an exceedence is not detected, an update of the model time constant $\tau_{model}$ may not be necessary as illustrated in block 328.

Calculated time constants that exceed tolerance from the model may be trended over time and compared to specified limits to set alerts as a form of sensor anomaly detection. This information may be compared to other temperature sensor diagnostic information that may be available from a performance gas path analysis to provide corroborating evidence of sensor degradation and potential sensor failure.

Various functionality, such as that described above with respect to an engine modeling system, can be implemented in hardware and/or software. In this regard, a computing device can be used to implement various functionality, such as that depicted in FIG. 3.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the FIG. 3 shows the architecture, functionality, and/or operation of a possible implementation of software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for updating a gas turbine engine reference model comprising the steps of:
   determining whether an absolute difference between a calculated time constant of a sensor and an assumed sensor model time constant is outside a tolerance value; and
   responsive to determining that the absolute difference is outside the tolerance value, updating the assumed sensor model time constant with the calculated time constant of the sensor;
   measuring a first engine parameter with a sensor;
   applying a first time-derivative to the first measured engine parameter data;
   applying a second time-derivative to the first measured engine parameter data;
   calculating a first instantaneous time constant with the second time-derivative of the first measured engine parameter data;
   storing the first instantaneous time constant in a memory;
   measuring a second engine parameter with the sensor;
   applying a first time-derivative to the second measured engine parameter data;
   applying a second time-derivative to the second measured engine parameter data;
   calculating a second instantaneous time constant with the second time-derivative of the second measured engine parameter data;
   storing the second instantaneous time constant; and
   selecting the calculated time constant from the instantaneous time constants.

2. The method of claim 1, further comprising the steps of:
   filtering the measured first engine parameter; and
   filtering the measured second engine parameter.

3. The method of claim 1, further comprising the steps of:
   filtering the second time-derivative of the first measured engine parameter data; and
   filtering the second time-derivative of the second measured engine parameter data.

4. The method of claim 1, further comprising the steps of:
   generating a histogram of the stored first instantaneous time constant and second instantaneous time constant; and
   selecting the calculated time constant from the histogram.

5. A gas turbine engine reference model system comprising:
   a sensor operative to measure a first engine parameter and a second engine parameter of a gas turbine engine;
   a sensor model having a sensor model time constant;
   a processor operative to determine if a gas turbine engine is in a transient operating condition, wherein responsive to determining that the engine is in a transient operating condition, the processor is further operative to:
      determine whether an absolute difference between a calculated time constant of the sensor and the sensor model time constant is outside a tolerance value; and
      responsive to determining that the absolute difference is outside the tolerance value, update the sensor model time constant with a value corresponding to the calculated time constant of the sensor; and
   wherein the processor is further operative to:
   apply a first time-derivative to data corresponding to a first engine parameter;
   apply a second time-derivative to data corresponding to the first engine parameter;
   calculate a first instantaneous time constant with the second time-derivative of the data corresponding to the first engine parameter;
   apply a first time-derivative to the data corresponding to a second engine parameter;
   apply a second time-derivative to the data corresponding to the second engine parameter;
   calculate a second instantaneous time constant with the second time-derivative of the data corresponding to the second engine parameter;
   store the second instantaneous time constant; and
   select the calculated time constant from the instantaneous time constants.

6. The system of claim 5, wherein the processor is further operative to filter the second time-derivatives.

7. The system of claim 5, wherein the processor is further operative to:
   generate a histogram of the first instantaneous time constant and second instantaneous time constant; and
   select the calculated time constant from the histogram.

8. A computer-readable medium having computer-executable instructions stored thereon for performing a method for updating a gas turbine engine reference model comprising the steps of:
   determining whether an absolute difference between a calculated time constant of a sensor and an assumed sensor model time constant is outside a tolerance value;
   responsive to deteimining that the absolute difference is outside the tolerance value, updating the assumed sensor model time constant with the calculated time constant of the sensor;
   determining if a gas turbine engine is in a transient operating condition such that, responsive to determining that the engine is in a transient operating condition, the determining and updating steps are performed;
   applying a first time-derivative to data corresponding to a first engine parameter;
   applying a second time-derivative to data corresponding to the first engine parameter;
   calculating a first instantaneous time constant with the second time-derivative of the data corresponding to the first engine parameter;
   applying a first time-derivative to the data corresponding to a second engine parameter;
   applying a second time-derivative to the data corresponding to the second engine parameter;

calculating a second instantaneous time constant with the second time-derivative of the data corresponding to the second engine parameter;

storing the second instantaneous time constant; and selecting the calculated time constant from the instantaneous time constants.

9. The computer readable medium of claim 8, wherein the method further comprises the steps of:

generating a histogram of the stored first instantaneous time constant and second instantaneous time constant; and selecting the calculated time constant from the histogram.

* * * * *